United States Patent [19]

Cuksee et al.

[11] 4,019,933
[45] Apr. 26, 1977

[54] POT LIFE EXTENSION OF ISOCYANATE CURED PROPELLANTS BY AZIRIDINE COMPOUNDS

[75] Inventors: Marjorie T. Cuksee, Huntsville; Henry C. Allen, Decatur, both of Ala.

[73] Assignee: The United States of America as represented by the Secretary of the Army, Washington, D.C.

[22] Filed: July 27, 1973

[21] Appl. No.: 385,930

[52] U.S. Cl. .................................. 149/19.4; 149/7; 149/19.9; 149/113
[51] Int. Cl.$^2$ .......................................... C06B 45/10
[58] Field of Search ............. 149/7, 19.4, 19.9, 113

[56] References Cited

UNITED STATES PATENTS

| 3,305,523 | 2/1967 | Burnside | 149/19.4X |
|---|---|---|---|
| 3,399,088 | 8/1968 | Christian et al. | 149/19.4 X |
| 3,480,488 | 11/1969 | Rudy et al. | 149/7 |
| 3,685,163 | 8/1972 | Olt | 149/113 X |
| 3,725,154 | 4/1973 | McCullock et al. | 149/113 X |
| 3,745,074 | 7/1973 | Allen | 149/7 |

FOREIGN PATENTS OR APPLICATIONS 1,034,937 7/1966 United Kingdom

OTHER PUBLICATIONS

Christenson et al., *Chem. Abs.*, 66, No. 38961, (1967).

*Primary Examiner*—Edward A. Miller
*Attorney, Agent, or Firm*—Nathan Edelberg; Robert P. Gibson; Jack W. Voigt

[57] ABSTRACT

The reaction products formed from tri-functional aziridinylphosphine oxides or their derivatives reacted with monofunctional carboxylic acids, the tri-aziridinyl derivatives of triazine, the tri-aziridinyl derivatives of benzenetriacyl, the aziridine compound N-phenethylaziridine, and selected alkyl diaziridine compounds are representive of the aziridine compounds which are utilized in isocyanate curable composite propellant compositions to extend usable pot life required for mixing and processing of the specified compositions. The compositions are comprised of a binder of hydroxy terminated liquid polymer systems, (e.g. hydroxy terminated polybutadiene and the like) selected plasticizers, optional metal fuel, and the inorganic oxidizer, ammonium perchlorate, that is substantially of very fine particle size (less than 20 microns).

3 Claims, 6 Drawing Figures

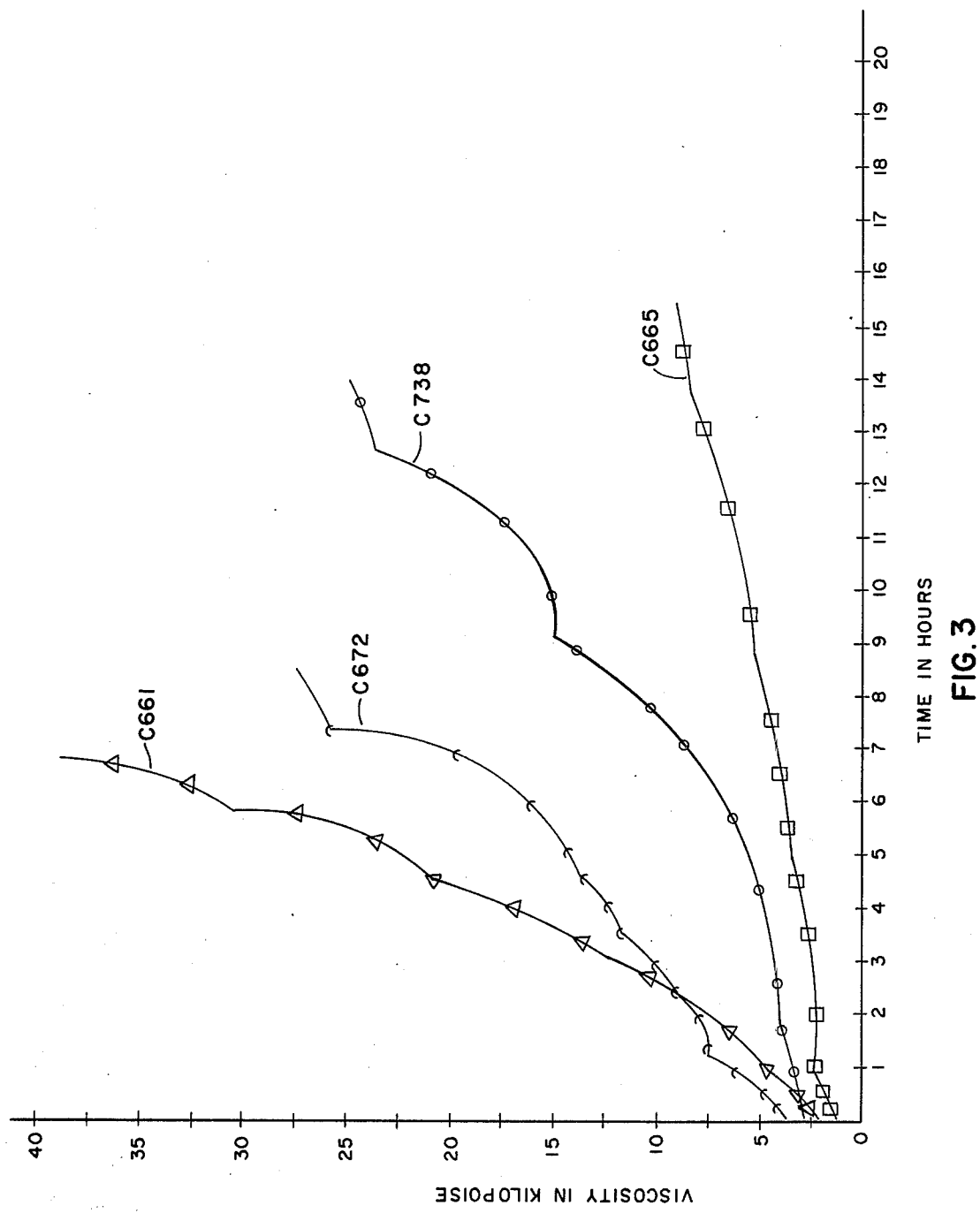

POT LIFE EXTENSION OF ISOCYANATE CURED PROPELLANTS BY AZIRIDINE COMPOUNDS

DEDICATORY CLAUSE

The invention described herein may be manufactured, used, and licensed by or for the Government for governmental purposes without the payment to us of any royalties thereon.

BACKGROUND OF THE INVENTION

High burning rate propellants have been formulated with very fine oxidizer particle sizes; however, the very fine particle sizes (less than 20 microns) result in decreased usable pot life. The usable pot life is the time available for accomplishing the processing steps of mixing and casting propellant before the propellant loses its fluid nature.

Earlier work in propellant technology has resulted in development of reaction products formed from reacting di- or tri-functional aziridinyl phosphine oxides or their derivatives with polyfunctional carboxylic acids. These reaction products have been used to coat inorganic oxidizer particles which are used in propellant compositions, and when so used, the coated particles enhance the mechanical properties of the propellant. Patent application Ser. No. 851,137, filed July 30, 1969, now U.S. Pat. No 3,762,972, and its divisional application Ser. No. 105,938, filed Jan. 12, 1971, and now U.S. Pat. No. 3,745,074, teach the process for preparation, the products produced, the products coated on ammonium perchlorate, and the coated ammonium perchlorate in propellant compositions. When the propellant compositions containing the described coated ammonium perchlorate are cured, the mechanical properties, particularly the strain at break and tensile strength, are greatly improved at 77° F as well as at −40° F. The propellant compositions contained, generally a 50–50 blend of very fine particle size ammonium perchlorate (17 micron nominal diameter) and larger particle size ammonium perchlorate (200 micron nominal diameter). The processing of this type blend of oxidizer particles can be accomplished without major problems relating to mixing and pot life.

The advantage of using substantially all very fine ammonium perchlorate in propellant compositions has been demonstrated with respect to improved burning rates. The problems encountered when using very fine ammonium perchlorate, however, which relate to mixing and retaining proper pot life have required much effort to be devoted to determining what can be done to permit using high percentage of fine ammonium perchlorate while retaining proper pot life for mixing and casting the propellant.

Therefore, an object of this invention is to provide compounds for extending pot life of isocyanate curable propellant compositions which employ very fine oxidizer.

Another object of this invention is to provide isocyanate curable propellant compositions having improved pot life to provide sufficient time for the mixing and casting thereof.

SUMMARY OF THE INVENTION

It has been discovered that tri-aziridinylphosphine oxide adducts which are formed by reacting tri-aziridinylphosphine oxides or their derivatives with monofunctional carboxylic acids extend the pot life of isocyanate curable propellant compositions when used as an additive to the propellant composition mix or when used to prior coat the ammonium perchlorate oxidizer that is used in the propellant composition. Other aziridinyl compounds, as described below, may be employed to extend pot life of isocyanate curable propellants.

The reaction of monofunctional carboxylic acid with a tri-functional aziridinylphosphine oxide yields adducts useful in this invention.

BRIEF DESCRIPTION OF THE DRAWINGS

FIGS. 1–6 are graphs which depict viscosity in kilopoise versus time in hours for various propellant mixes. The graphs illustrate the extension of usable pot life of propellants containing very fine ammonium perchlorate. The graphs illustrate pot life extension achieved when aziridine compounds are coated on the surfaces of the very fine ammonium perchlorate.

DESCRIPTION OF THE PREFERRED EMBODIMENTS

Figure 2:
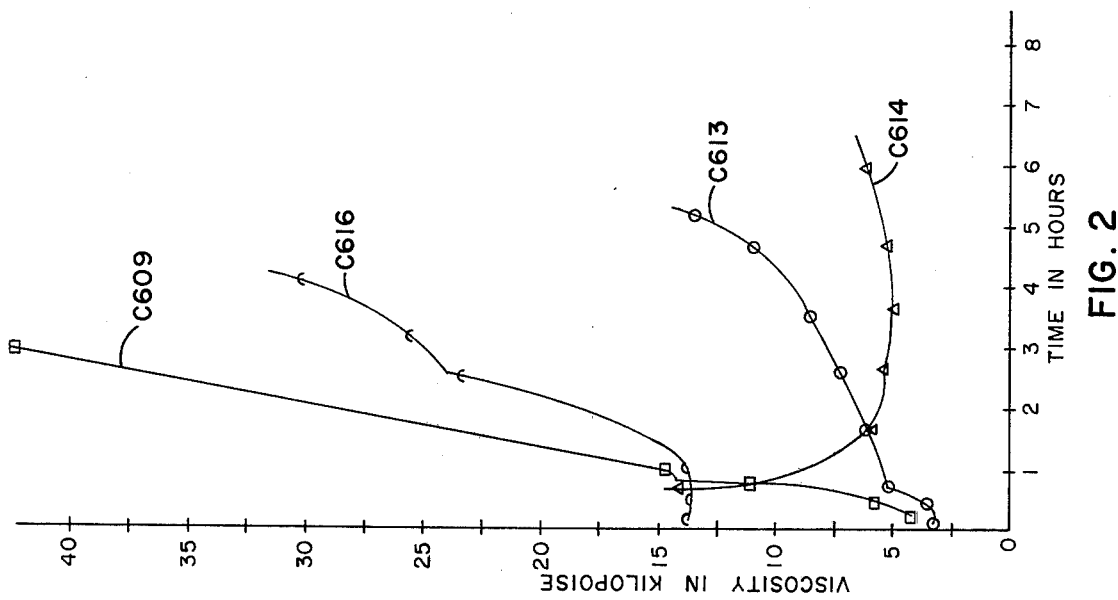

The reactants and adducts useful in this invention are described and represented as follows:

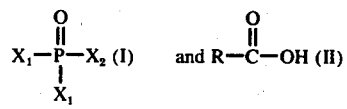

Where $X_1$ represents an aziridine group of the structure

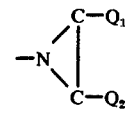

and $Q_1$ and $Q_2$ are either hydrogen or alkyl groups of one to four carbon atoms ($Q_1$ and $Q_2$ may be the same or different), $X_2$ may be the same as $X_1$ or may be an organic radical. R is an organic entity containing one or more carbon atoms.

Nominally when these are reacted mole for mole a reaction product of the following general formula results:

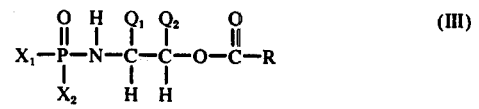

In actuality this is the primary product, but also formed in substantially less quantity are the following:

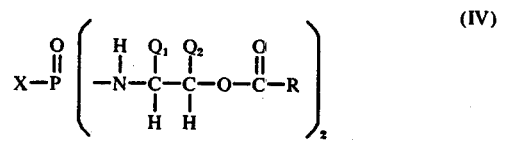

and

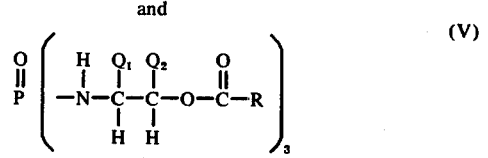

This mixture of products does not appear to harm the function of the material so long as a 1 to 1 mole relation of reactants is maintained and the major product is III.

An adduct of the type compound (III) is prepared by reacting one mole of tris-1-(2-methyl aziridinyl)phosphine oxide and 1 mole of acetic acid. Acetic acid is representative of the many monofunctional carboxylic acids which can be reacted with tris-1-(2-methyl aziridinyl)phosphine oxide to yield adducts useful in this invention. The adduct is referred to as HA in the Glossary and Composition Table appearing below.

The monofunctional fatty acids are also reacted on a 1 to 1 molal basis with tris-1-(2-methylaziridinyl)phosphine oxide to yield adducts which greatly facilitate processing by reducing viscosity during propellant mixing and extend pot life. Stearic acid is a fatty acid which forms an adduct useful in this invention. The stearic acid derivative, 12 hydroxy stearic acid, also forms an adduct with tris-1(2-methylaziridinyl)phosphine oxide which then coated on AP greatly extends pot life.

The adducts of monofunctional carboxylic acid and tri-aziridinyl phosphine when used to coat ammonium perchlorate, either prior to or during propellant mixing, function as a bonding agent, processing aid, and cure catalysis inhibitor in hydroxy-terminated liquid polymer systems in which large quantities (up to about 88%) of very fine ammonium perchlorate are used.

The cure catalysis function of ammonium perchlorate in propellants is believed to be related to the effective surface area of the ammonium perchlorate, the greater the surface area, the faster the curing rate with a corresponding increase in viscosity in a shorter time period of mixing. Thus, the coating of the fine ammonium perchlorate with the adducts forming from reacting aziridinyl phosphine oxide with the monofunctional carboxylic acids inhibits or prevents the catalysis of the urethane type reaction (isocyanate-hydroxyl reaction) thus greatly extending the pot life, the time available for processing and casting propellant. The measurement of pot life can be related to viscosity measurements. The viscosity measurement on a Brookfield viscosimeter is arbitrarily set at the time it takes for the viscosity to reach 40 kilopoise. The graphs of FIGS. 1–6 vividly depict change in pot life as the viscosity is plotted against time.

The compounds which are tri-aziridinyl derivatives of triazine (represented by structure VI), the tri-aziridinyl derivatives of benzenetriacyl (represented by structure VII), or N-phenethylaziridine (represented by structure VIII) are equally effective in extending useful pot life of propellant mix.

STRUCTURE VI

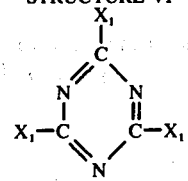

Wherein $X_1$ is an aziridine group:

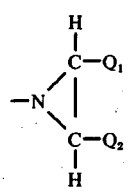

and $Q_1$ and $Q_2$ are either hydrogen or alkyl groups of one to four carbon atoms.

STRUCTURE VII

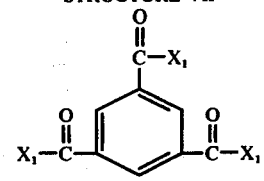

wherein $X_1$ is as described for structure VI.

STRUCTURE VIII

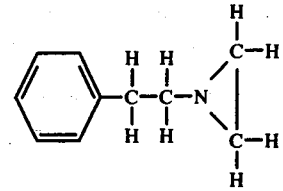

The prior art compounds used for strengthening the physical properties have been tested, and the tests indicate that the compounds provide pot life extension as shown by FIGS. 1, 2, 3, 4, 5, and 6. The prior art compounds are tris 1(2 methylazirindinyl) phosphine oxide (MAPO), and $MT_4$, the adduct of 2.0 moles of tris 1(2 methylaziridinyl) phosphine oxide, 0.7 mole adipic acid, and 0.3 mole tartaric acid.

Compounds which are represented by the generic structure VI, VII, and VIII are: 2,4,6 tris[1-(2 ethyl) aziridinyl] triazine, 1,3,5 benzene tri[acyl 1-(2 ethylaziridine)], and N-phenethylaziridine respectively, also referred to as HX874, HX868, and PEA respectively. Some of the additional compounds which are useful in this invention are identified in the Glossary and Composition Table appearing below.

The disclosed aziridine compounds when coated on the surface of ammonium perchlorate greatly extend the pot life of the propellant mix as compared to a like propellant mix containing ammonium perchlorate without the aziridine compound coating thereon. The effect to pot life is very pronounced in the very fine range of particle size, i.e. less than 20 micron AP.

Figure 1:
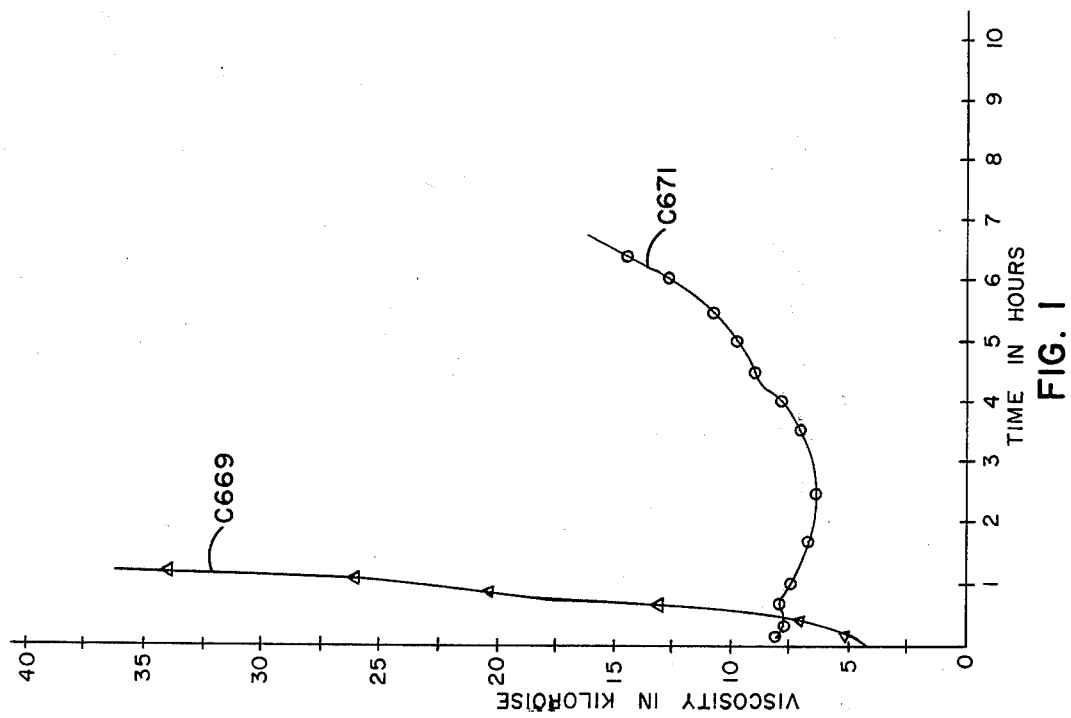

Although $MT_4$ has been used in hydroxyterminated polybutadiene (HTPB) composite propellants as a bonding agent since the early days of HTPB binder development, it was inadvertently recognized in a development program as a member of a class of compounds which effect pot life where very fine AP is utilized. During the development program of work with a propellant mix which should require no bonding agent, the $MT_4$ was omitted. The propellant mix employed very fine AP (17 $\mu$) blended with a courser blend of AP (200 $\mu$). When the $MT_4$ was omitted, a drastic reduction in expected pot life resulted. Mix 669 and mix 671 of the Composition Table (appearing below) are the mixes without $MT_4$ and with $MT_4$ respectively. FIG. No. 1, C669 representing mix No. 669, illustrates how the pot life is reduced to less than 1½ hours when $MT_4$ is omitted. FIG. 1, C671 representing mix 671, illustrates how pot life is extended when $MT_4$ is coated on AP and used in the propellant mix. Because of these observations, mixes were made with only AP and binder, with and without MT₄. It was observed that the pot life was dependent on the surface area of the AP, the greater the surface area, the shorter the pot life. Again it was observed that the addition of MT₄ extended the pot life, FIG. No. 2, C614 and C616 representing mixes 614 and 616 respectively. FIG. 2, C613 and C609 representing mixes 613 and 609, illustrate reduced life when no MT₄ is used. It is believed that the MT₄ is polymerized on the surface of the AP thus isolating the AP from the cure reaction. In fact, some additional testing confirmed that the MT₄ is polymerized on the AP surfaces.

It has been discovered that other aziridines function to extend pot life so long as these aziridines reduce the surface area of AP. To obtain evidence to support this hypothesis, batches of AP were coated with various aziridines and propellants were prepared from these. The aziridine compounds tried, MAPO, PEA, and MT₄, were all effective in extending pot life. FIG. No. 3, C665, C672, and C738 representing mixes 665, 672, and 738, illustrates the extended pot life as compared to C661 with no aziridine coatings.

Figure 4:
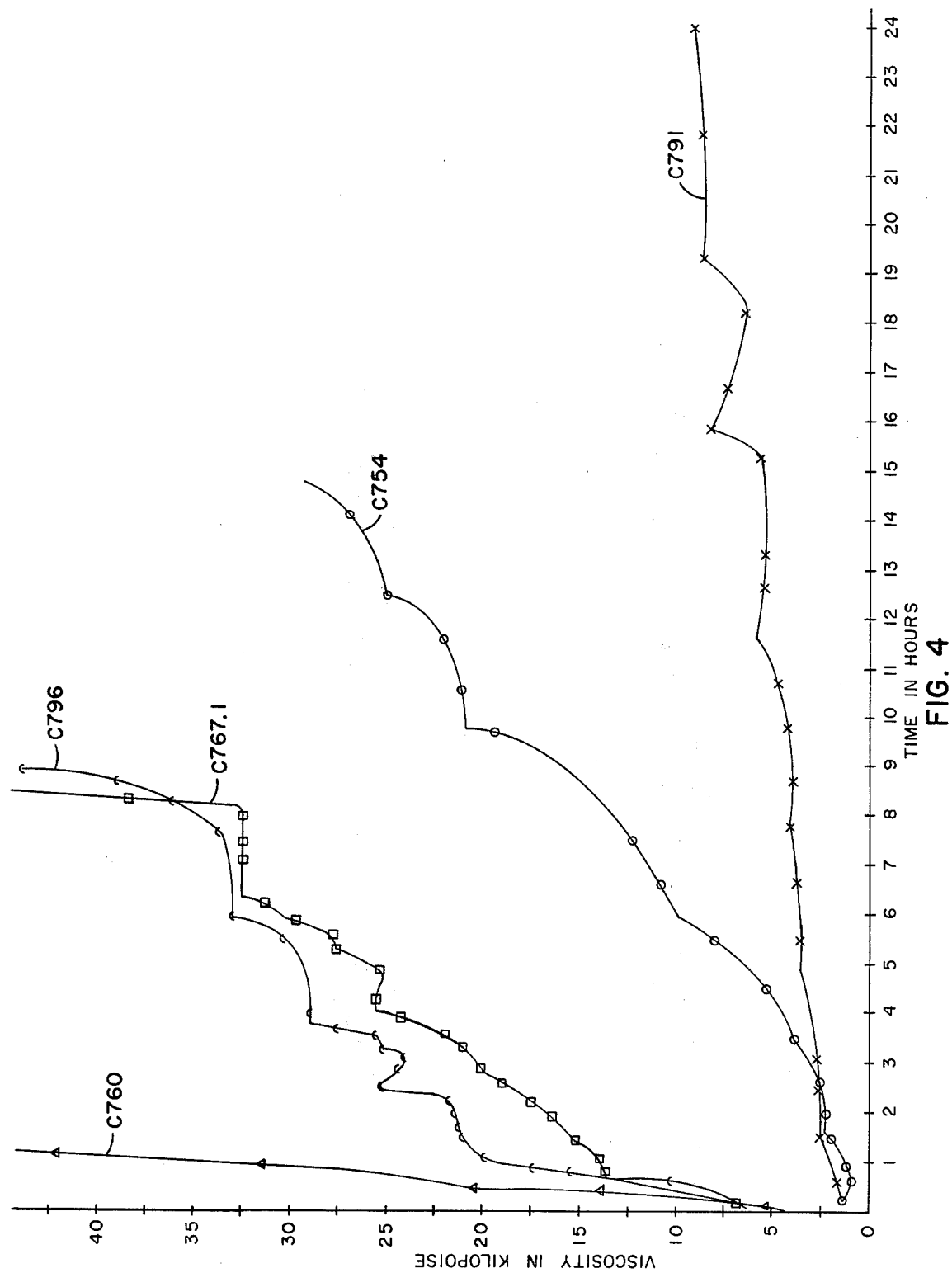

In high rate propellants, very fine uncoated AP is typically used in conjunction with fluid burn rate catalysts which are notorious cure accelerators. After the discovery of the catalytic effect of fine AP, it was assumed that some of the cure catalysis formerly attributed to the fluid burning rate catalysts might in fact be derived from the AP or possibly even a synergistic effect between the burn rate catalyst and the AP. A series of mixes were made with and without aziridine coatings and with and without Catocene, a liquid ferrocene burn rate catalyst. Again it was found that the aziridine coating (precoated on the AP in this series) greatly increased the pot life, from 1 hour with Catocene and uncoated AP to 8½ hours with Catocene and MAPO or MT₄ coated AP. FIG. No. 4, C767.1, C796, and 791 representing mixes 767.1, 796, and 791 with coated AP with Catocene and without Catocene. FIG. 4, C754 and C760 represent mixes 754 and 760 with no coating and no Catocene and with only Catocene respectively.

Figure 5:
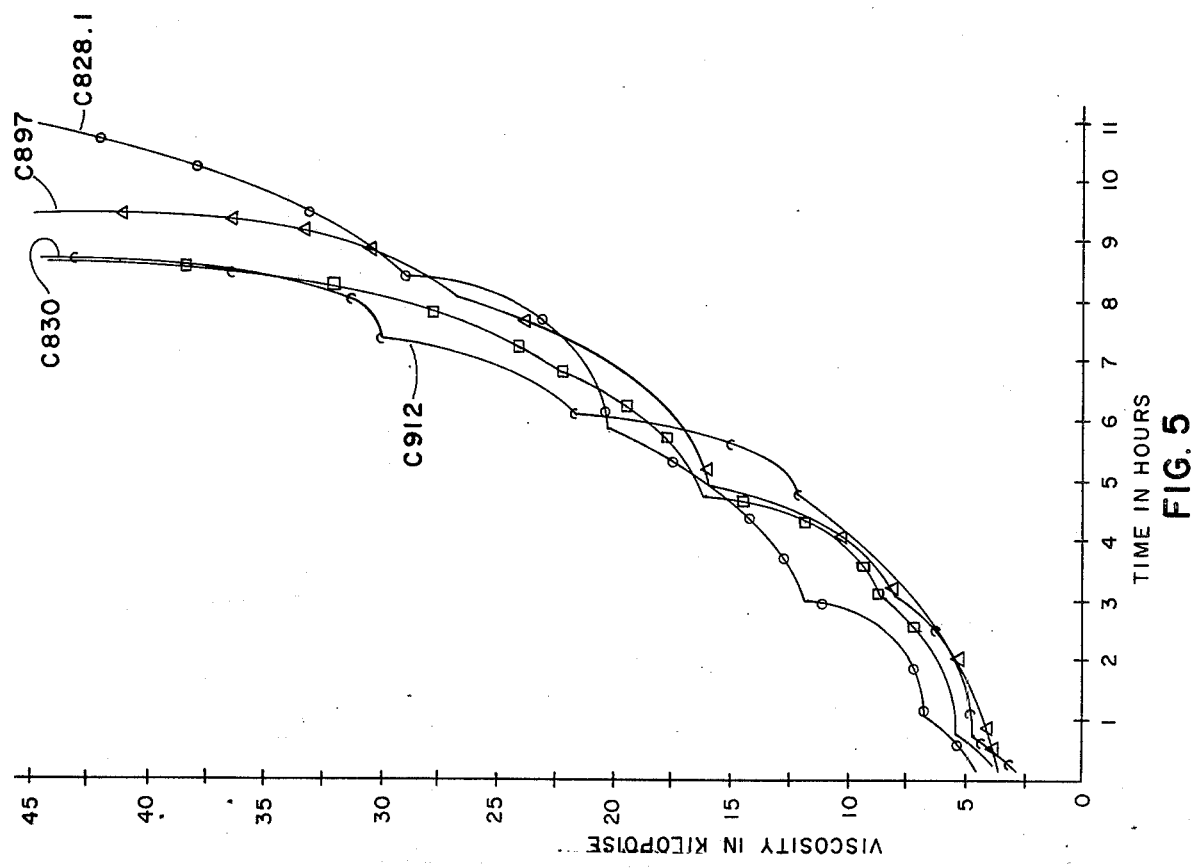

The effect on pot life by other aziridines is confirmed in a series of mixes employing batches of AP ground on the SWECO grinder with different types of aziridines used as grinding aids. During the course of grinding the aziridines which is dissolved in the solvent media polymerizes on the AP surfaces to give an effective coating on the resultant fine AP. The behavior of the mixes made with PEA, MAPO, HX868, and HX874 was very similar. FIG. 5, C828.1, C897, C830, and C912 representing mixes 828.1, 897, 830, and 912 employing PEA, MAPO, HX868, and HX874 respectively, further illustrate the extended pot life effect due to aziridine coated AP. Since the AP cannot be effectively ground in the SWECO grinder without a grinding aid, no uncoated AP control sample could be made. It can be seen that these coatings, however, are very effective when it is considered that these samples used 0.6 μ AP compared to 3 μ in mix C609, FIG. 2 and the MAPO coating in mix No. 665 tremendously increased the pot life over that of mix No. 661 which contained uncoated AP, as shown in FIG. 3, C661. In FIG. No. 6 the effect of several aziridine adducts on pot life of an experimental propellant is shown. These only slightly miscible aziridine adducts were added directly to the propellant mixes so that coating occurred during the propellant processing. Additional work with the experimental propellant has also shown that very poor pot life (less than 1 hour) is obtained when the MT₄ is present but inadequately dispersed so that inadequate coating results. Therefore, it is very necessary that the AP is adequately coated to obtain the increased pot life required.

Figure 6:
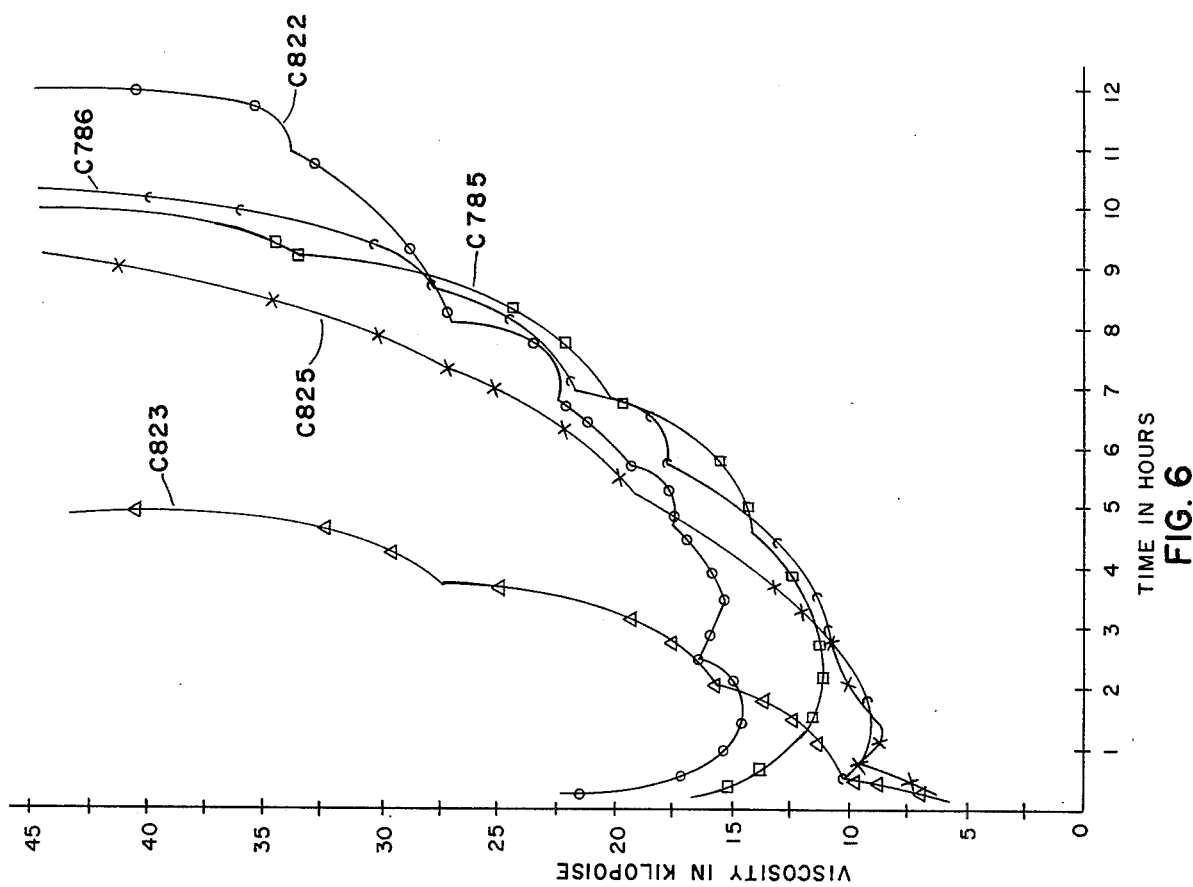

FIG. 6, C785 and C786 representing mixes 785 and 786, illustrates that increasing the MT₄, an only slightly miscible adduct, from 0.15 to 0.30% did not effect the pot life. FIG. 6, C823 representing mix 823 with no coating and C822 and C825 representing mixes using HA and APAT, further illustrate the improvement to pot life when the respective aziridine adducts are used in the mix.

The adducts employed in this invention may be prepared by several methods. The adduct may be prepared "neat" simply by stirring the two material together for several hours at 62° C. The reactions may also be carried out by dissolving the reactants in an inert solvent, mixing, and holding the solution at temperatures between 60° and 100° C until the carboxy groups are reacted. Ideally the temperature should not exceed 65° C because the aziridine groups will homopolymerize and the homopolymerization rate is related to the temperature of the material. The solvent is then removed by any suitable means, such as by evaporation under vacuum at slightly elevated temperature (should not exceed 65° C). The product of either procedure is a straw colored waxy solid at room temperature; at 65° C it is a very fluid liquid.

GLOSSARY

1. APAT—Adduct of 2.0 moles tris 1 aziridinyl phosphine oxide, 0.7 mole of adipic acid, and 0.3 mole tartaric acid.
2. HA—Adduct of 1.0 mole tris 1(2-methylaziridinyl) phosphine oxide and 1.0 mole acetic acid.
3. HX 868—1,3,5 benzenetri[acyl 1-(2ethylaziridine)]
4. HX-874—2,4,6 tris[1-(2 ethyl) aziridinyl] triazine
5. MAPO—tris 1(2methylaziridinyl) phosphine oxide
6. MT₁—adduct of 2.0 moles of tris 1(2-methylaziridinyl) phosphine oxide and 1.0 mole tartaric acid.
7. MT₄—adduct of 2.0 moles tris 1(2 methylaziridinyl) phosphine oxide, 0.7 mole adipic acid, and 0.3 mole tartaric acid.
8. PEA—N-phenethylaziridine
9. DOA—dioctyl adipate, a plasticizer
10. IDP—isodecyl pelargonate, a plasticizer
11. DDI—dimeryl diisocyanate (curing agent), used in amount of 1.5% of propellant formulation.
12. IPDI—isophorone diisocyanate (curing agent), used in amount of about 0.8% of propellant formulation.

COMPOSITION TABLE

| Figure | Mix No. | Plasticizer | Catalyst | Curing Agent | Ammonium Perchlorate | Coating Agent |
|---|---|---|---|---|---|---|
| 1 | 669 | DOA-1.14% | Fe₂O₃ 0.17% | DDI | 200μ, 60.44%; 17μ, 25.90% | None |
| 1 | 671 | DOA-1.14% | Fe₂O₃ 0.17% | DDI | 200μ, 60.44%: 17μ, 25.90% | 0.17% MT₄, direct addition |
| 2 | 613 | IDP-4.40% | None | IPDI | 17μ, 82.42% | None |

COMPOSITION TABLE-continued

| Figure | Mix No. | Plasticizer | Catalyst | Curing Agent | Ammonium Perchlorate | Coating Agent |
|---|---|---|---|---|---|---|
| 2 | 614 | IDP-4.37% | None | IPDI | 17μ, 81.97% | 0.55% MT$_4$, direct addition |
| 2 | 609 | IDP-1.14% | None | IPDI | 3μ, 81.78% | None |
| 2 | 616 | IDP-1.13% | None | IPDI | 3μ, 81.32% | 0.57% MT$_4$, direct addition |
| 3 | 661 | IDP-3.54% | None | IPDI | 3μ, 78.6% | None |
| 3 | 665 | IDP-3.54% | None | IPDI | 3μ, 78.6% | MAPO, precoated |
| 3 | 672 | IDP-3.54% | None | IPDI | 3μ, 78.6% | PEA, precoated |
| 3 | 738 | IDP-3.54% | None | IPDI | 3μ, 78.6% | Mt$_1$, precoated |
| 4 | 754 | IDP-3.0% | None | IPDI | 200μ, 38.0%; 3μ, 40.0% | None |
| 4 | 760 | None | 3.06% Catocene | IPDI | 200μ, 38.0%; 3μ, 40.0% | None |
| 4 | 767.1 | None | 3.06% Catocene | IPDI | 200μ, 38.0%; 3μ, 40.0% | MAPO, precoated |
| 4 | 796 | None | 3.06% Catocene | IPDI | 200μ, 38.0%; 3μ, 40.0% | MT$_4$, precoated |
| 4 | 791 | IDP-3.0% | None | IPDI | 200μ, 38.0%; 3μ, 40.0% | MAPO, precoated |
| 5 | 828.1 | IDP-3.0% | None | IPDI | 200μ, 28.0%; 0.6μ, 50.0% | PEA, SWECO Grinding Aid |
| 5 | 897 | IDP-3.0% | None | IPDI | 200μ, 28.0%; 0.6μ, 50.0% | MAPO, SWECO Grinding Aid |
| 5 | 830 | IDP-3.0% | None | IPDI | 200μ, 28.0%; 0.6μ, 50.0% | HX-874, SWECO Grinding Aid |
| 5 | 912 | IDP-3.0% | None | IPDI | 200μ, 28.0%; 0.6μ, 50.0% | HX-868, SWEGO Grinding Aid |
| 6 | 823 | DOA-1.0% | Fe$_2$O$_3$ 0.1% | DDI | 200μ, 53.13%; 17μ, 22.77% | None |
| 6 | 822 | DOA-1.0% | Fe$_2$O$_3$ 0.1% | DDI | 200μ, 53.13%; 17μ, 22.77% | 0.15% HA, direct addition |
| 6 | 785 | DOA-1.0% | Fe$_2$O$_3$ 0.1% | DDI | 200μ, 53.13%; 71μ, 22.77% | 0.15% MT$_4$, direct addition |
| 6 | 786 | DOA-1.0% | Fe$_2$O$_3$ 0.1% | DDI | 200μ, 53.13%; 17μ, 22.77% | 0.30% MT$_4$, direct addition |
| 6 | 825 | DOA-1.0% | Fe$_2$O$_3$ 0.1% | DDI | 200μ, 53.13%; 17μ, 22.77% | 0.15% APAT, direct addition |

The aziridine compounds which are effective in extending pot life may also be described by their structural formulae appearing below. Although, the compounds which may be grouped under the structural formulae appearing below have, in some cases, been disclosed under structural formulae shown earlier herein, it is believed that the additional structural formulae will provide beneficial guidelines in selecting aziridine compounds useful in this invention. In the following structural formula the symbol for phenyl is expressed as: Φ. Also, for convenience the symbol AZ is used for the aziridine group:

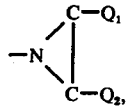

which has been further identified hereinabove. Other identities of the structural formulae are as set forth.

1. R'—R"—AZ, wherein R' is selected from the monovalent groups consisting of —Φ, —OH, —NH$_2$, —CH$_3$, —C≡N, —(CH$_2$)$_n$OH, —(CH$_2$)$_n$ C≡N, —(CH$_2$)$_n$ NH$_2$, —(CH$_2$)$_n$ Φ, benzoquinone radical, piperidine radical, napthalene radical, and benzene radical with n equal to 1 to 5, R" is selected from the group consisting of —(CH$_2$)$_n$—,

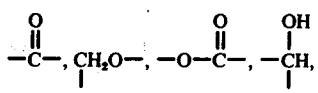

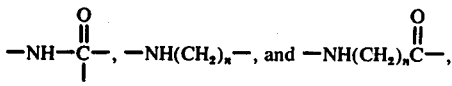

with n equal to 1 to 5.

2. (CH$_2$)$_n$ (R'''—AZ)$_2$, n equals 1 to 5, R''' is selected from

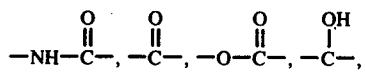

and —CH$_2$O.

3. Q(AZ)$_n$, n equals 1 to 3 and Q is selected from

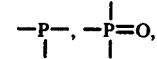

benzoquinone radical, triazine radical, piperidine radical, napthalene radical, benzenetriacyl radical, and benzene radical.

4. Q(R—AZ)$_n$, n equals 1 to 3; Q is selected from

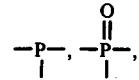

benzoquinone radical, triazine radical, piperidine radical, naphthalene radical, benzene radical; R is selected from (CH$_2$)$_n$,

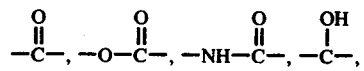

— CH$_2$O —, and —NH(CH$_2$)$_n$ —, n equals 1 to 5.

The structural formula R'—R"—AZ represents 2 aziridinylethanol, phenethylaziridine and many other similar commercially available compounds which can function as the coating agent for AP to thereby extend pot life.

The structural formula Q(AZ)$_3$ represents 2,4,6 tris[1-(2 ethyl) aziridinyl] triazine (HX874), and the structural formula Q(R—AZ)$_3$ represents 1,3,5 benzenetri[acyl 1-(2 ethylaziridine)] (HX868).

Although the aziridine compounds which have been cited by name or by structural example function as a coating agent for very fine AP to thereby extend pot life for propellant compositions, other aziridine compounds may function in the desired capacity. The aziridine groups can be attached to many types of nuclei and provide the desired benefit as shown by the representative examples.

Generally, the aziridine compounds which are effective in extending pot life are preferably precoated on the ammonium perchlorate. However, in certain conditions the aziridine compound may be added to the propellant mix provided the coating of the AP can take place in the mix. The criteria for this will be given later hereinbelow.

The coating of the AP may be accomplished in a variety of ways. A few examples are precoating by slurring the AP in a solution of the aziridine, using the aziridine compound as a grinding aid such as in a SWECO grinder, or in some cases by adding the aziridine compound directly to the propellant mix. Certain aziridines seem to work equally well by direct addition to the propellant mix or by precoating. Such aziridines seem to have a very low miscibility with the binder. Other aziridine compounds are preferably added by precoating the AP by the slurry method or by the grinding aid method.

The Composition Table shows mixes with percentages of ingredients as indicated. In all mixes the balance of the composition of the ingredients percent by weight not specified includes hydroxy-terminated polybutadiene (HTPB) and isocyanate crosslinking agent. For example, mix 671 contains 1.14% DOA, 0.1% $Fe_2O_3$, 60.44% 200$\mu$ AP and 25.90% 17$\mu$ AP (86.34 total % AP), 0.17% $MT_4$, and the balance of 12.25% being HTPB and DDI of which about 1.5% of propellant composition is DDI and about 10.75% of propellant composition is HTPB. The Composition Table illustrates that from about 0.05 to about 0.6% of the aziridine compound as coating agent extends the pot life to the desirable range. Where the Table does not specify, the amount of the coating agent would be in the range % stated.

We claim:

1. An isocyanate curable composite propellant composition having extended pot life, said composition comprised of hydroxy terminated polybutadiene, an isocyanate curing agent, and the inorganic oxidizer, ammonium perchlorate, that is less than 20 micron particle size and the is coated with an aziridine compound selected from compounds represented as follows:

a reaction product formed from tri-aziridinylphosphine oxides or derivatives thereof reacted with monofunctional carboxylic acids, said tri-aziridinylphosphine oxides or derivatives thereof represented by the structure:

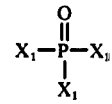

wherein $X_1$ represents an aziridine group of the structure:

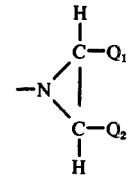

wherein $Q_1$ and $Q_2$ are selected from the group consisting of hydrogen or alkyl groups of one to four carbon atoms and said monofunctional carboxylic acid represented by the structure:

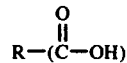

wherein R is an organic entity containing one or more carbon atoms, said reactio product represented by the structure:

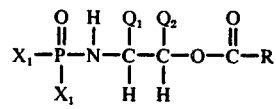

wherein $X_1$, $Q_1$, $Q_2$, and R are as defined above.

2. The propellant composition of claim 1 wherein said aziridine selected is the reaction product formed from reacting 1.0 mole of tris 1-(2-methylaziridinyl) phosphine oxide with 1.0 mole of acetic acid.

3. The propellant composition of claim 2 wherein said ammonium perchlorate is substantially of very fine particle size of less than 20 microns, said ammonium perchlorate being coated with from about 0.05% to about 0.06% by weight of said aziridine compound.

* * * * *